(12) United States Patent
Wittkopp

(10) Patent No.: US 6,358,178 B1
(45) Date of Patent: Mar. 19, 2002

(54) PLANETARY GEARING FOR A GEARED NEUTRAL TRACTION DRIVE

(75) Inventor: Scott Henry Wittkopp, Ypsilanti, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/611,981

(22) Filed: Jul. 7, 2000

(51) Int. Cl.[7] ............................................. F16H 37/02
(52) U.S. Cl. ...................... 475/207; 475/216; 475/219
(58) Field of Search ............................... 475/216, 217, 475/218, 207, 206, 215, 219

(56) References Cited

U.S. PATENT DOCUMENTS

| | | | | |
|---|---|---|---|---|
| 4,430,908 A | * | 2/1984 | Stockton | 74/688 |
| 4,768,398 A | * | 9/1988 | Greenwood | 74/691 |
| 5,607,372 A | | 3/1997 | Lohr | 475/216 |
| 6,213,907 B1 | * | 4/2001 | Wooden | 475/216 |

* cited by examiner

*Primary Examiner*—Sherry Estremsky
*Assistant Examiner*—Tisha D. Lewis

(74) *Attorney, Agent, or Firm*—Laura C. Hargitt; Leslie C. Hodges

(57) ABSTRACT

A powertrain having an engine and a continuously variable transmission provides a continuously variable drive ratio between the engine and the transmission output. The transmission includes a continuously variable unit (CVU) and a planetary gear arrangement. The CVU is of the traction type. The planetary gear arrangement has a compound planetary gear set, two simple planetary gear sets, and two torque transmitting mechanisms. The compound gear set is disposed adjacent the CVU and has members connected with the input and the output of the CVU. The two simple planetary gear sets are disposed axially between the compound planetary gear set and transmission output shaft. The sun gear member of the compound planetary gear set is rotatably supported on a single shaft that passes axially therethrough and transmits power from the engine to the carrier assembly member of the compound planetary gear set and one input member of the CVU. The sun gear members of the simple planetary gear sets are interconnected and rotatably supported on a single shaft that passes axially therethrough and delivers power from the ring gear member of the compound planetary gear set and the carrier assembly member of one simple planetary gear set to one of the torque transmitting mechanisms. The torque transmitting mechanisms are supplied with pressurized fluid through a common support element.

6 Claims, 3 Drawing Sheets

PLANETARY GEARING FOR A GEARED NEUTRAL TRACTION DRIVE

TECHNICAL FIELD

This invention relates to planetary gearing and more particularly to planetary gearing for use with a traction type continuously variable transmission.

BACKGROUND OF THE INVENTION

Continuously variable transmissions (CVT) incorporate a continuously variable unit (CVU) and planetary gearing to provide a substantially continuously variable ratio between an engine and the drive wheels of a vehicle. The CVU can be of the belt type or the traction type commonly called a toric drive. The belt type requires the input shaft and the output shaft of the CVU to be on non-coaxial spaced axis. The traction type permits the input and output shaft to be located coaxially. This arrangement lends itself to rear wheel drive vehicles where the barrel diameter of the transmission is an important design consideration.

Many prior art arrangements of traction drive CVTs include a transfer shaft between the planetary gearing and the CVU to connect the CVU output with a member of a summing gear set that also has a member connected with the CVU input. These arrangements, of course, increase the barrel diameter of the transmission housing. One prior art arrangement shown in U.S. Pat. No. 5,607,372 discloses a CVT having a centrally disposed planetary carrier and two sun gears meshingly interconnected to permit coaxial input and output members of the CVU. This arrangement does add axial length to the transmission package.

SUMMARY OF THE INVENTION

It is an object of the present invention to provide an improved gearing arrangement for a geared neutral continuously variable transmission (CVT).

In one aspect of the present invention, a continuously variable unit (CVU) is operatively connected with a gearing arrangement comprised of three planetary gear sets and two torque transmitting mechanisms. In another aspect of the present invention one of the planetary gear sets is a compound planetary gear set and the other two are simple planetary gear sets. In yet another aspect of the present invention, the compound planetary gear set is disposed adjacent the CVU and the two simple planetary gear sets are disposed between the compound planetary gear set and the output of the CVT.

In still another aspect of the present invention, the sun gears of each of the planetary gear sets each have only a single rotating shaft passing concentrically therethrough. In a further aspect of the present invention, the ring gear member of the compound planetary gear set and the carrier assembly member of one of the simple planetary gear sets are connected with a rotatable shaft that pass concentrically through both sun gear members of the simple planetary gear sets. In a yet further aspect of the present invention, the carrier assembly member of the compound planetary gear set is drivingly connected with an input shaft of the CVU which passes concentrically through the sun gear member of the compound planetary gear set. In a still further aspect of the present invention, the torque transmitting mechanisms are disposed in a location that permit the supply of pressurized fluid thereto through a single support member located at one end of the transmission housing.

The transmission is comprised of a continuously variable unit of the traction type. The CVU has two input discs or shells and two output discs or shells. The input and output discs are frictionally interconnected in pairs by traction members. The output discs are driven rotationally through the traction members by the input discs that are driven by a prime mover such as an engine. The input disc and the output discs are also interconnected through a compound planetary gear set that serves to combine the rotary motion of both for delivery to a pair of simple planetary gear sets. The input discs are drivingly connected with the carrier assembly member of the compound planetary gear set by a shaft that passes concentrically through and rotatably supports the sun gear member which is drivingly connected with the output discs.

The two simple planetary gear sets have interconnected sun gear members that are rotatably supported on a shaft drivingly connected between the carrier assembly member of one simple planetary gear set and a first selectively engageable friction torque transmitting mechanism. The one carrier assembly member is also drivingly connected with the ring gear member of the compound gear set. The carrier assembly member of the other simple planetary gear set is operatively connected with a second selectively engageable friction torque transmitting mechanism and the ring gear member is connected with an output shaft and the first torque transmitting mechanism.

In one embodiment of the invention, the ring gear member of the compound planetary gear set and the carrier assembly member of the one simple planetary gear set are interconnected by a hub or shell that surrounds the one simple planetary gear set. The carrier assembly member of the compound planetary gear set and the ring gear member of the one simple planetary gear set are interconnected by a hub disposed between the planetary gear sets.

In another embodiment of the invention, the carrier assembly member of the compound planetary gear set and the ring gear member of the one simple planetary gear set are drivingly interconnected by a hub or shell that surrounds the exterior and partially encloses one end of the compound planetary gear set. The ring gear member of the compound planetary gear set and the carrier assembly member of the one simple planetary gear set are drivingly interconnected by a hub disposed between the planetary gear sets.

In both embodiments of the present invention the torque transmitting mechanism disposed between the carrier assembly member of the one simple planetary gear set and the ring gear member of the other simple planetary gear set is selectively engaged to provide a low range output. The torque transmitting mechanism connected with the carrier assembly member of the other simple planetary gear set is selectively engaged to provide a high range output. Also both embodiments are radially compact since the sun gear members of each planetary gear set only has to accommodate one rotating shaft disposed concentric therewith. As those familiar with the art will appreciate, a small sun gear member diameter permits a smaller overall radial dimension for the planetary gear set.

DESCRIPTION OF AN EXEMPLARY EMBODIMENT

Figure 1:
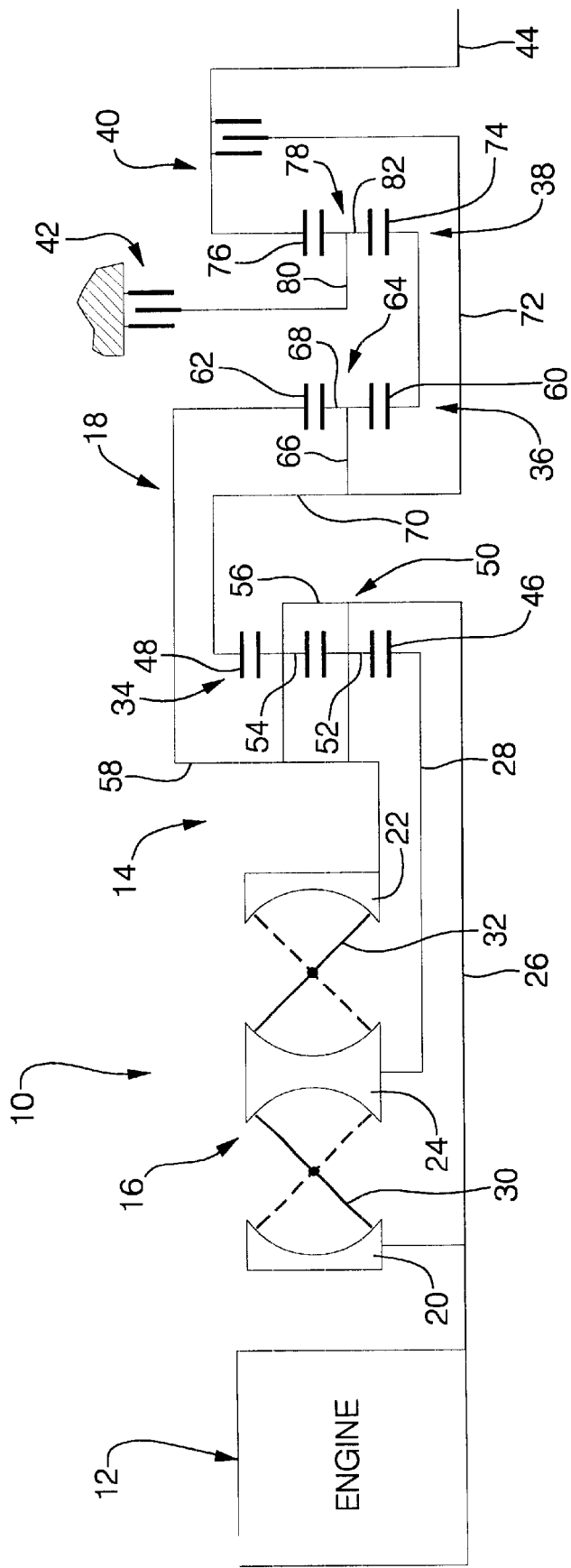
FIG. 1 is a schematic representation of a powertrain incorporating the present invention.

Referring to the drawings where like characters represent the same or corresponding parts throughout the several views there is seen in FIG. 1 a powertrain 10 consisting of an engine 12 and a continuously variable transmission(CVT) 14. The CVT 14 has a continuously variable unit (CVU) 16 and a planetary gear arrangement 18. The engine 12 and CVU 16 are conventional mechanisms that are well-known in the art of power transmission. The CVU 16 may be of a half toroidal or full toroidal type. The CVU 16, shown as a full toroidal type, has a pair of annular input discs 20, 22 and a double sided output disc 24. The input disc 20 is drivingly connected with an input shaft 26 and the output disc 24 is connected with a CVT 14 output shaft 28. The input discs 20, 22 are frictionally interconnected with the output disc 24 through a plurality of traction or friction rollers 30, 32 respectively.

The planetary gear arrangement 18 has a compound planetary gear set 34, two simple planetary gear sets 36, 38, a pair of selectively engageable torque transmitting mechanisms 40, 42 and an output shaft 44. The compound planetary gear set 34 includes a sun gear member 46, a ring gear member 48 and a planet carrier assembly member 50. The planet carrier assembly member 50 has a plurality of pairs of intermeshing pinion gear members 52 and 54 that mesh with the sun gear member 46 and the ring gear member 48 respectively. The pinion gear members 52, 54 are rotatably mounted in a cage or spider 56 that is connected to the input shaft 26, the input disc 22 and a hub or shell 58. The input shaft 26 passes through and rotatably supports the sun gear member 46.

The simple planetary gear set 36 includes a sun gear member 60, a ring gear member 62 and a planet carrier assembly member 64 that includes a cage or spider 66 in which is rotatable mounted a plurality of pinion gear members 68 that mesh with both the sun gear member 60 and the ring gear member 62. The cage 66 is connected with a hub 70 that is connected between the ring gear member 48 and an intermediate shaft 72. The ring gear member 62 is drivingly connected with the shell 58 and therefore the planet carrier assembly member 50. The sun gear member 60 is continuously connected with a sun gear member 74 of the planetary gear set 38. The intermediate shaft 72 passes through and rotatably supports the sun gear members 60 and 74. The shaft 72 is operatively connected with the torque transmitting mechanism 40.

The planetary gear set 38 also includes a ring gear member 76 and a planet carrier assembly member 78 that has a cage or spider 80 rotatably supporting a plurality of pinion gear members 82 disposed in meshing relation with both the sun gear member 74 and the ring gear member 76. The cage 80 is operatively connected with the torque transmitting mechanism 42. The ring gear member 76 is continuously connected with the output shaft 44 through a hub 84 and is operatively connected with the torque transmitting mechanism 40. When the torque transmitting mechanism 40 is engaged, the ring gear member 48 and the planet carrier assembly member 64 are both connected with the ring gear member 76.

The traction rollers 30 and 32 are shown with the CVU 16 in the maximum underdrive condition in solid lines and in the maximum overdrive position in dashed lines in FIG. 1. Between these to extreme positions is a speed ratio wherein the speed of the ring gear member 48 will be zero. This point is determined by the sun gear member to ring gear member ratio in the compound planetary gear set 34. At this point, when the torque transmitting mechanism 42 is disengaged and the torque transmitting mechanism 40 is engaged, the CVT 14 will be in geared neutral condition. When the CVU 16 ratio is changed from the neutral point to an increased CVU 16 overdrive ratio, the output of the CVT 14 will rotate in reverse. At the maximum overdrive ratio in the CVU 16 the maximum reverse output speed is attained at the output shaft 44. When the CVU 16 ratio is moved from the neutral point toward the maximum underdrive position, the output shaft 44 will rotate forwardly. At the maximum underdrive position of the CVU 16, the maximum low range speed is reached.

The torque transmitting mechanisms 42 and 40 can be interchanged synchronously at the maximum underdrive point of the CVU 16. This places the CVT 14 in the high range. The CVU 16 ratio is then adjusted toward the maximum overdrive ratio to further increase the speed of the output shaft 44 in the forward direction. The output speed of the CVT 14 can also be changed by changing the speed of the engine 12. However, the engine speed does not affect the neutral point nor the synchronous shift point. In the embodiment shown in FIG. 2, the shell 58, surrounding the planetary gear set 34, has side wall 84 in which a plurality of openings 86 are formed. The cage 56 has a plurality of tabs 88 that are positioned in respective ones of the openings 86. The cage 56 also has an inner splined portion 90 that is drivingly connected with a shaft 92 that is drivingly connected with the input disc 22. The shell 58 has a toothed end portion 94 that drivingly engages a toothed portion 96 formed on the outer periphery of the ring gear member 62. The cage 56 also has a splined portion 98 that is drivingly connected with the input shaft 26. Thus the planet carrier assembly member 50 and the ring gear member 62 and the traction disc 22 are rotated in unison at the speed of the engine 12. The sun gear member 46 is rotatably supported on the shaft 26 through a bushing 99 and the splined portion 98.

The hub 70 is a portion of the cage 66 and includes a splined outer portion 100 that is drivingly connected with the ring gear member 48. The hub 70 is welded or otherwise secure with the shaft 72. The sun gear members 60 and 74 are interconnected by a shaft 102 formed integral with the sun gear member 60 and splined at 104 to the sun gear member 74. The shaft 102 is rotatably supported on the shaft 72 through bushings 106 and 108.

The cage 80 of the planet carrier assembly member 78 has a hub 110 having a cylindrical outer periphery 112 that has teeth 114 formed thereon. The torque transmitting mechanism 42 has a plurality of friction plates 116 having toothed inner diameters that are drivingly connected with the hub 110. The torque transmitting mechanism 42 also has a plurality of friction plates 118, a backing plate 122 and a presser plate 124 that are drivingly connected with a toothed section 120 formed on a transmission housing 126. The torque transmitting mechanism 42 has an apply piston 128 that is slidably disposed in a cavity 130 formed in the housing 126. The piston 128 includes a drum or shell 132, which is positioned to abut the presser plate 124 and thereby engage the torque transmitting mechanism 42 when pressurized fluid is admitted to the cavity 130 through a passage 134 from a conventional electro-hydraulic control, not shown. The torque transmitting mechanism 42 is a reaction clutch or brake. The torque transmitting mechanism 42 is engaged during the high forward range.

The ring gear member 76 has a splined outer periphery that drivingly engages a shell 136 that is welded to or otherwise secured with the output shaft 44. The shell 136 has a toothed inner periphery that drivingly engages a plurality of friction plates 138 that are components of the torque transmitting mechanism 40. The torque transmitting mechanism 40 also includes a plurality of inner friction plates 140 that drivingly engage a hub 142 that in turn is splined to the shaft 72. An apply piston 144 of the torque transmitting mechanism 40 is slidably disposed in a chamber 146 formed by the shell 136 and the shaft 44. Pressurized fluid is directed from the electrohydraulic control to the chamber 146 through a plurality of passages 148, 150, 152, and 154. The passage 150 communicates with the passage 148 through a cavity 156 and an opening 158 formed in a sleeve 160.

A balance chamber 162 is formed between the piston 144 and a dam 164 that sealingly engages the piston 144. Low pressure fluid is continuously connected with the balance chamber 162 through a plurality of passages 166, 168, 170, and 172. The passage 166 communicates with the passage 168 through a cavity 174 and an opening 176 formed in the sleeve 160. The torque transmitting mechanism 40 is a rotating clutch. The fluid in the balance chamber prevents the torque transmitting mechanism from drifting on due to centrifugal force when the chamber 146 is not pressurized. The torque transmitting mechanism 40 is engaged during reverse, geared neutral, and low forward range. Both torque transmitting mechanisms 40 and 42 can be disengaged to provide a true neutral regardless of the ratio in the CVU 16. The supply passages 134, 148, and 166 are all formed in one end 194 of the transmission housing and the necessary fluid transfer is made through a single interface formed by the sleeve 160 and the cavities 156 and 174. This construction aids in reducing the overall length of the transmission.

Figure 2:
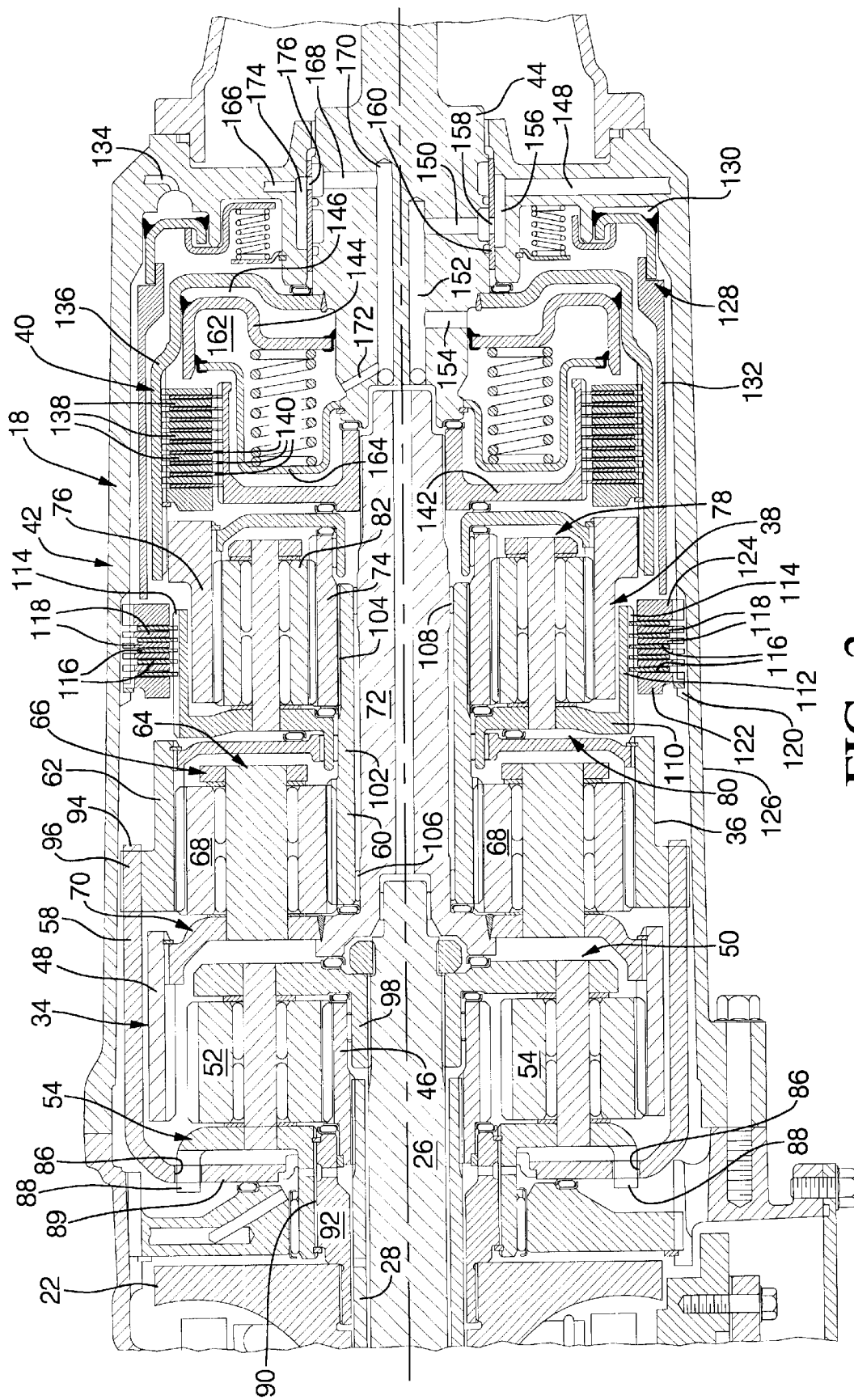
FIG. 2 is an elevational view of one embodiment of a planetary gear arrangement incorporating the present invention.
Figure 3:
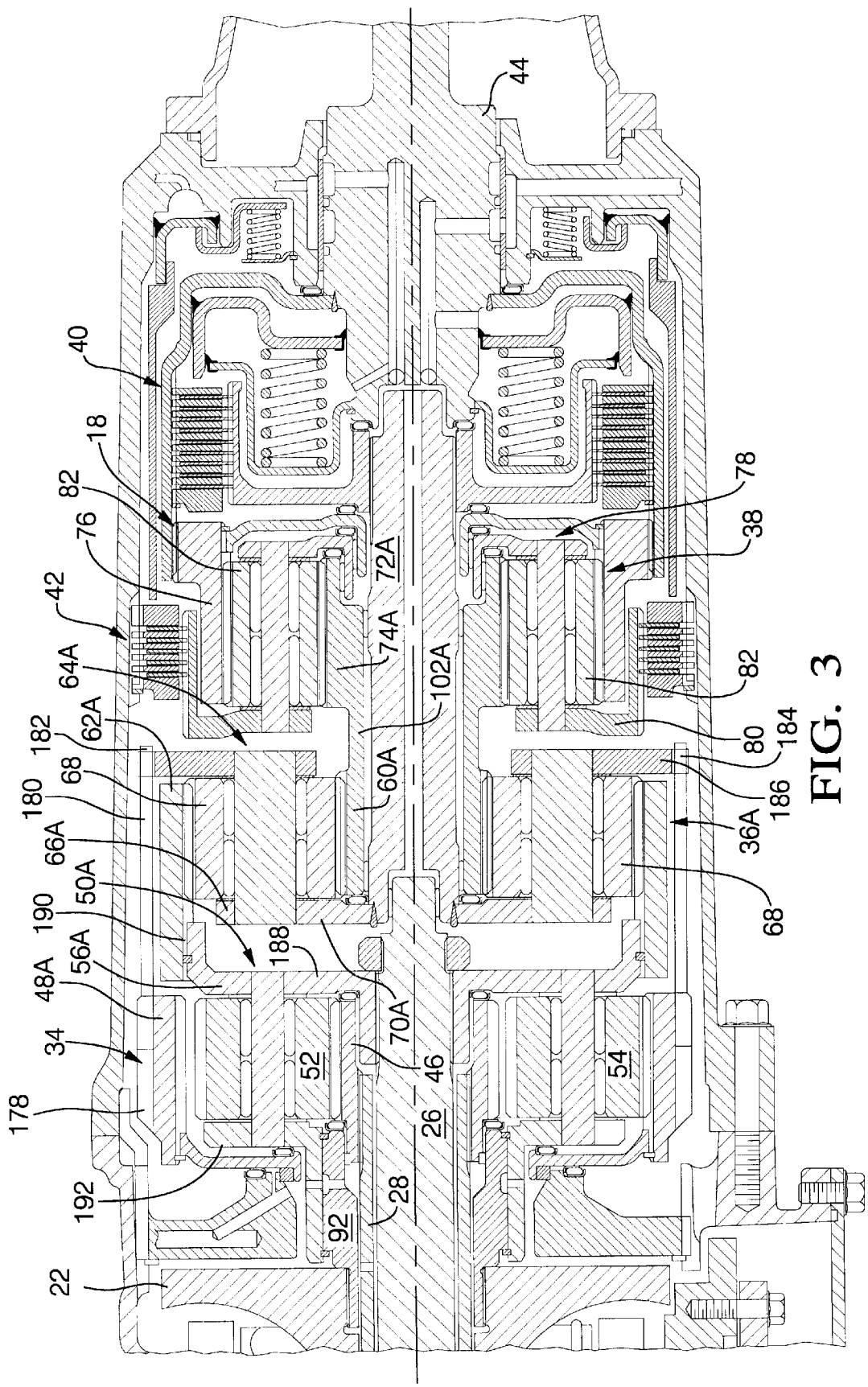
FIG. 3 is an elevational view of another embodiment of a planetary gear arrangement incorporating the present invention.

The embodiment shown in FIG. 3 is similar to that shown in FIGS. 1 and 2. Some differences are found in the connections between the compound planetary gear set 34 and the simple planetary gear set 36 and the connection between the sun gear members 60 and 74. In FIG. 3, the sun gear members 60A and 74A are formed integrally on a shaft 102A. The ring gear member 48A has toothed outer periphery 178 to which a shell 180 is drivingly connected. The shell 180 has a toothed end 182 that is drivingly connected with a toothed outer periphery 184 of a side wall 186 of the cage 66A. The ring gear member 62A is connected to a side wall 188 of the cage 56A through a spline 190. The cage 56A has a second side wall 192 that connects the planet carrier assembly member 50A with the shaft 92 and the input disc 22. The hub 70A, which is a side wall for the cage 66A, is welded or otherwise secured to the shaft 72A. With the exception of the sun gear member 74A, the planetary gear set 38 is the same as that shown in FIG. 2. The construction of the torque transmitting mechanisms 40 and 42 is the same as that shown in FIG. 2.

What is claimed is:

1. A continuously variable transmission comprising:
   an input member;
   an output member;
   a continuously variable unit positioned coaxial with and connected to said input member;
   a compound planetary gear set, positioned axially adjacent said continuously variable unit, including a sun gear member, a carrier assembly member, and a ring gear member, a shaft portion of said input member passing coaxially through and rotatably supporting said sun gear member, said shaft portion being the sole rotating member passing through said sun gear member and being drivingly connected with said carrier assembly member;
   a first simple planetary gear set, positioned axially adjacent said compound planetary gear set, including a sun gear member, a ring gear member, and a carrier assembly member;
   a second simple planetary gear set, positioned coaxially between said first simple planetary gear set and said output member, including a sun gear member, a ring gear member, and a carrier assembly member, said sun gear member being drivingly connected with said sun gear member of said first simple planetary gear set; and
   an intermediate shaft passing coaxially through and rotatably supporting both said sun gear members of said first and second simple planetary gear sets, said intermediate shaft being the sole rotating member passing through said sun gears and being continuously drivingly connected with said ring gear member of said compound gear set and said carrier assembly member of said first simple planetary gear set and transmitting rotation therefrom to a selectively engageable torque transmitting mechanism connectable between said intermediate shaft and said output member.

2. A continuously variable transmission comprising:
   input means including input shaft means for transmitting power to said continuously variable transmission;
   output means including output shaft means for transmitting power from said continuously variable transmission;
   a continuously variable unit having axially spaced input members and centrally disposed output members, said input shaft means passing concentrically through said continuously variable unit and being drivingly connected to a first of said input members;
   a compound planetary gear set disposed adjacent said continuously variable unit and having a first sun gear member drivingly connected with said output members of said continuously variable unit, a first carrier assembly member drivingly connected with a second of said input members, and a ring gear member, said input shaft means having a portion thereof passing concentrically through said first sun gear member and being drivingly connected with said first carrier member and being the only rotatable member passing through said first sun gear;
   a first simple planetary gear set disposed adjacent said compound planetary gear set and having a second sun gear member, a second carrier assembly member continuously drivingly connected with said first ring gear member, and a second ring gear member drivingly connected with said first carrier assembly member;
   a second simple planetary gear set disposed between said first simple planetary gear set and said output means and having a third sun gear member continuously drivingly connected with said second sun gear, a third ring gear member continuously drivingly connected with said output means, and a third carrier assembly member; and
   an intermediate shaft means for transmitting power from said first ring gear member and said second carrier assembly member to a first torque transmitting mechanism that is selectively connectable with said output means, said intermediate shaft means passing concentrically through said second and third sun gear members and being the sole rotatable member passing therethrough.

3. The continuously variable transmission defined in claim 2 further comprising:

a second torque transmitting mechanism selectively connectable between said third carrier assembly member and a stationary portion of said transmission, said second torque transmitting means being engaged to establish a reverse range and a first forward range in said transmission and said continuously variable unit being controllable to provide a variable between an overdrive ratio to an underdrive ratio to establish the reverse range, a geared neutral condition, and the first forward range.

4. The continuously variable transmission defined in claim 3 further comprising:

said first torque transmitting mechanism being selectively engaged to provide a second forward range and said continuously variable unit being controlled from an underdrive ratio to an overdrive ratio during said second forward range.

5. The continuously variable transmission defined in claim 4 further comprising:

said second and first torque transmitting mechanisms being synchronously interchanged when said continuously variable unit is at a maximum underdrive ratio.

6. The continuously variable transmission defined in claim 5 further comprising:

closure means formed on said housing;

fluid passage means formed in said closure means for supplying fluid to and exhausting fluid from said first torque transmitting mechanism and said second torque transmitting mechanism.

\* \* \* \* \*